United States Patent [19]
Mantell

[11] Patent Number: 6,068,361
[45] Date of Patent: May 30, 2000

[54] METHOD AND APPARATUS FOR MULTIPLE DROP ERROR DIFFUSION IN A LIQUID INK PRINTER

[76] Inventor: David A. Mantell, 275 Yarmouth Rd., Rochester, N.Y. 14610

[21] Appl. No.: 08/961,233

[22] Filed: Oct. 30, 1997

[51] Int. Cl.[7] .................. B41J 2/21; B41J 2/205
[52] U.S. Cl. ................... 347/15; 347/43; 358/298
[58] Field of Search ............... 347/15, 43; 358/298, 358/502

[56] References Cited

U.S. PATENT DOCUMENTS

| | | | |
|---|---|---|---|
| 4,680,645 | 7/1987 | Dispoto et al. | 358/298 |
| 4,930,018 | 5/1990 | Chan et al. | 358/298 |
| 5,111,302 | 5/1992 | Chan et al. | 358/298 |
| 5,140,432 | 8/1992 | Chan | 358/298 |
| 5,245,678 | 9/1993 | Eschbach et al. | 382/50 |
| 5,291,311 | 3/1994 | Miller | 358/456 |
| 5,374,997 | 12/1994 | Eschbach | 358/466 |
| 5,434,672 | 7/1995 | McGuire | 358/296 |
| 5,608,821 | 3/1997 | Metcalfe et al. | 382/252 |
| 5,633,729 | 5/1997 | Smith et al. | 358/456 |
| 5,877,786 | 3/1999 | Sekiya et al. | 347/15 |

*Primary Examiner*—Joan Pendegrass
*Attorney, Agent, or Firm*—Tallam I. Nguti

[57] ABSTRACT

A apparatus and method for multiple drop error diffusion in a liquid ink printing system having a print driver including a multiple drop error diffusion circuit. The print driver controls a liquid ink printhead and includes an error diffusion circuit which generates a drop signal as a function of an error signal and a threshold reference signal. The drop signal causes the liquid ink printhead to deposit a plurality of ink drops within one of a plurality of pixel locations on a recording medium. A method includes producing a print driver, for a color liquid ink printer including determining a number of a plurality output levels as a function of a number of a plurality of input levels where a number of ink drops are assigned to each of the determined number of the plurality of output levels.

24 Claims, 4 Drawing Sheets

METHOD AND APPARATUS FOR MULTIPLE DROP ERROR DIFFUSION IN A LIQUID INK PRINTER

FIELD OF THE INVENTION

This invention relates generally a method and apparatus for liquid ink printing and more particularly to liquid ink printing including multiple drop error diffusion and multiple drop overprinting.

CROSS-REFERENCE TO RELATED APPLICATION

Cross-reference is made U.S. Patent Application entitled "Liquid Ink Printing With Small Drop Overprinting", Ser. No. of 08/673,517, to U.S. Patent Application entitled "Checkerboard Printing for Multiple Drops per Pixel Ink Jet Printing", Ser. No. 08/781,365, and to "Ink Jet Printer Having Multiple Level Grayscale Printing", Ser. No. 08/829,033, to David A. Mantell and assigned to Xerox Corporation, herein incorporated by reference.

BACKGROUND OF THE INVENTION

Liquid ink printers of the type frequently referred to as continuous stream or as drop-on-demand, such as piezoelectric, acoustic, phase change wax-based, or thermal, have at least one printhead from which droplets of liquid ink are directed towards a recording medium. Within the printhead, the ink is contained in a plurality of ink conduits or channels. Power pulses cause the droplets of ink to be expelled as required from orifices or nozzles at the ends of the channels towards a recording medium whereupon hitting the recording medium a dot or spot of ink is deposited. The channel is then refilled by capillary action, which, in turn, draws ink from a supply container of liquid ink.

Such printers typically print color and/or monochrome images received from an image output device or document creator such as a personal computer, a scanner, or a workstation. The color images printed are produced by printing with several colored inks or colorants of different colors at a time. The color of the ink and amount of ink deposited by the printer is determined according to image information received from the document creator. The document creator provides an input digital signal gray-scale image, which is either defined in monochromatic terms, colorimetric terms, or both. The amount of gray level is typically defined by an input pixel value ranging from 0 to 255, where 0 is equal to white, 255 is equal to black, and value therebetween are shades of gray. Commonly this description may be part of a Page Description Language (PDL) file describing the document. These colors are defined independently of any particular device, and accordingly reference is made to the information as being "device independent".

The printer, on the other hand, has an output which is dependent on the device or "device dependent". Consequently, a transformation must be made from the input digital gray scale image to the printed binary image since the binary image includes binary information which either has a gray level value of zero (white) or one (black), but not levels of gray therebetween. These transformations, from an input image to an output image, are made with a number of known halftoning algorithms, including dithering or screening, where over a given area having a number of gray separation pixels therein, a value representing the density of each separation pixel of an array of gray separation pixels within the area is compared to one of a set of preselected thresholds (the thresholds are stored as a dither matrix and the repetitive pattern generated by this matrix is considered a halftone cell).

Error diffusion is another known halftoning method which attempts to accurately reproduce gray by making a conversion from gray pixels to binary or multilevel pixels on a pixel-by-pixel basis. Error diffusion examines each pixel with respect to a threshold, and the difference between the gray level pixel value and the output value is forwarded to a selected group or set of neighboring pixels in accordance with a weighting scheme. Error diffusion, while having advantages over halftoning methods, most notably the higher frequency of the output pixels, error diffusion also suffers from certain disadvantages.

First, there are a number of artifacts that significantly, degrade image quality. These include worms in highlight and shadow regions and limit cycles at intermediate gray values (mostly at $\frac{1}{3}$, $\frac{1}{2}$, and $\frac{2}{3}$). Second, error diffusion algorithms take more time to process. The processing time can be a considerable problem particularly for greater than 600 spot per inch(spi) data. A color 600 spi contone image is already about 40 megabytes. Third, the tone reproduction (TRC) curve for error diffusion can approach black far faster than halftoning due to the tendency for the algorithm to produce isolated pixels. Thus, fully half of the available levels are not used after the TRC correction. Fourth, instability of the smallest pixel can greatly degrade image quality. For a xerographic printer this might mean that neither small partial pixels such as $\frac{1}{4}$ pixel black or white can be reliably printed. In ink jet printing, the restriction in the highlight region is removed but the restriction in the shadow regions is much the same as xerographic printing because, as with the third difficulty, the TRC correction eliminates isolated subpixel gaps. Fifth, error diffusion of different color planes can create color shifts from accidental correlation of pixels on different color planes.

Various printers and methods are illustrated and described in the following disclosures which may be relevant to certain aspects of the present invention.

In U.S. Pat. No. 4,680,645 to Dispoto et al., a method for rendering gray scale images with variable dot sizes is described. Errors in gray level are used to modulate the sizes of the dots in producing the image. The method minimizes the non-linearity caused by the overlapping of dots which occurs with by level printers.

U.S. Pat. No. 4,930,018 to Chan et al. describes a method and system for enhancing the quality of both color and black and white images produced by inkjet printers. The method involves determining the maximum allowable ink print density necessary to reduce or eliminate paper cockleing in the printed media and then providing type control of the selection of gray scale ink drop count and associated dye loading in relation to this maximum allowable print density.

U.S. Pat. No. 5,111,302 to Chan et al. describes a method of gray scale printing of dots of one or more colors into pixels and in a controlled ordered sequence into a plurality of super pixels defined by a given number of the pixels. One or more levels of dot loading are used to achieve different values of gray level in a multiple level gray table.

U.S. Pat. No. 5,140,432 to Chan describes a pixel assignment and error diffusion system and method for gray scale printing in one or more color planes in the fields of inkjet printing, electro-photographic printing, or the like. In adaptive error diffusion process is described where the error diffused value, equal to the remainder difference between a scanned image gray scale pixel value and a printable gray level value within a chosen gray table, is distributed to super pixels surrounding a just scanned or just processed super pixel.

U.S. Pat. No. 5,245,678 to Eschbach et al. describes image conversion with lossy adaptive error diffusion. Gray level pixel values in an image where each pixel value is represented by C levels are quantized by applying a threshold level to each pixel value in the image to produce a pixel value having D levels.

U.S. Pat. No. 5,291,311 to Miller describes an apparatus and a method for generating a multi-level half tone image from a digitally sampled continuous tone image. The apparatus generates a multi-level halftone using a look up table selection technique.

U.S. Pat. No. 5,374,997 to Eschbach describes high addressability error diffusion with minimum mark size. High addressability image signals, each representing a pixel in an image, where the signal has one of a relatively large number of signal levels, are directed through an error diffusion quantization process, for the conversion of the signal to one of a relatively small number of signals.

U.S. Pat. No. 5,434,672 to McGuire describes a pixel error diffusion method. Error diffusion in printing an information processing systems is accomplished according to combined internal and external super pixel error diffusion techniques. For a particular super pixel, the error amounts of a selected internal subject pixel are provided to another internal subject pixel until a determined or selected final pixel error value within the selected pixel has been determined. The final internal error value is distributed among selected super pixels within a predetermined super pixel neighborhood.

U.S. Pat, No. 5,608,821 to Metcalfe et al. describes a method and system implementing a high addressability characteristic into an error diffusion process. A gray level value representing a pixel has a first resolution which corresponds to an original input resolution. The gray level value is interpolated to generate a sub pixel gray level value corresponding to a second resolution. An error value is generated as a result of thresholding. A portion of the error value is diffused to adjacent pixels on a next scan line.

U.S. Pat. No. 5,633,729 to Smith et al. describes a process for minimizing the quantization error in multi-level halftone transfer functions. A method for quantizing a set of mean-preserving tone transfer functions for a multi-level halftoning system minimizes or reduces the overall quantization error in the system.

SUMMARY OF THE INVENTION

In accordance with one aspect of the present invention, there is provided a method of producing a print driver, for a color liquid ink printer, depositing drops of ink on a recording medium in response to an input image, including a plurality of input pixels each having a first number of input levels of optical density, to form an output image including a plurality output pixels, each having a second number of output levels of optical density. The method includes the steps of determining the second number of the plurality output levels as a function of the first number of the plurality of input levels, assigning a threshold reference signal to each of determined number of the plurality of output levels, assigning a number of ink drops to each of the determined number of the plurality of output levels, generating a signal lookup table including the assigned threshold reference signals and the assigned number of ink drops, and producing a print driver, including an error diffusion circuit, coupled to the signal lookup table, to receive from the signal lookup table one of the assigned threshold reference signals.

Pursuant to another aspect of the present invention, there is provided a color printing system for printing in response to an input image signal, including a plurality of input pixels each having a first number of input levels of optical density, an output image including a plurality of pixel location. The printing system includes a printhead, to deposit a plurality of ink drops on the recording media to print the image, and a print driver, to control the printhead, receiving the input image, including an error diffusion circuit, generating a drop signal as a function of an error signal and a threshold reference signal, the drop signal to cause said color printhead to deposit a plurality of ink drops within one of the plurality of pixel locations.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 4:
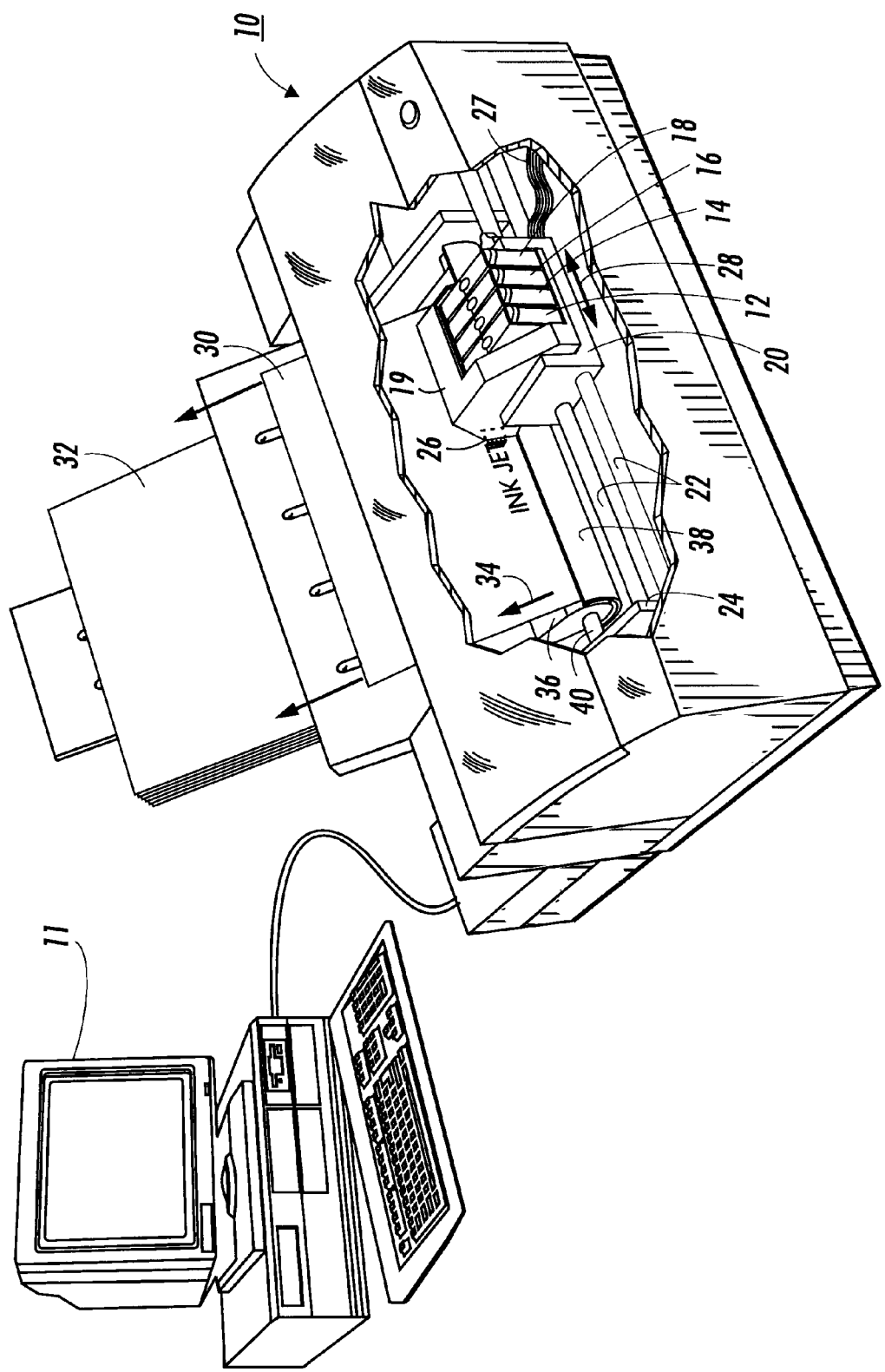
FIG. 4 is a perspective view of a color ink jet printing system incorporating the present invention.

FIG. 4 illustrates a perspective view of a color printing system including a color thermal ink jet printer 10. Printer 10 is exemplary only. The invention can be practiced in other types of thermal ink jet printers, as well as other reproduction devices including liquid ink printers driven by signals from a document raster input scanner or signals received from a computing device, such as a personal computer 11. Printer 10 includes four ink jet ink containers 12, 14, 16, and 18 mounted in a print cartridge 19 on a carriage 20 supported by carriage rails 22. The carriage rails 22 are supported by a frame 24 of the ink jet printer 10. The printhead cartridge, which comprises the ink containers, contain ink for supply to one or more thermal ink jet printheads 26 which selectively expel droplets of ink under control of electrical signals received from a controller (not shown) of the printer 10 through an electrical cable 27. The printhead 26 contains a plurality of ink channels which carry ink from one or more of the ink containers 12, 14, 16, and 18 to respective ink ejecting orifices or nozzles of the printhead 26.

When printing, the carriage 20 reciprocates or scans back and forth along the carriage rails 22 in the direction of an arrow 28. As the printhead 26 reciprocates back and forth across a recording medium 30, fed from an input stack 32 containing, for instance, sheets of paper or transparencies, droplets of ink are expelled from selected ones of the printhead nozzles towards the recording medium 30. The ink ejecting orifices or nozzles are typically arranged in a linear array substantially perpendicular to the scanning direction 28 and consequently images are created line by line in multiple swaths of the printhead. In pagewidth printers a single line of information crosses substantially the entire width or length of the recording medium.

If printing in color, such a linear array can be segmented such that segments of the array deposit different colors of ink to complete a color image. It is also possible that each of the ink tanks be connected to or include an individual linear nozzle array such that the printer includes four linear arrays, one for each ink. Combinations of segmented arrays and individual arrays are also possible. During each pass of the carriage 20, the recording medium 30 is held in a stationary position. At the end of each pass, the recording medium is stepped in the direction of an arrow 34. For a more detailed explanation of the printhead and printing thereby refer to U.S. Pat. No. 4,571,599 and U.S. Pat. No. Re. 32,572, the relevant portions of which are incorporated herein by reference.

The single recording sheet 30 is fed from the input stack through the printer along a path defined by a curved platen 36 and a guide member 38. The sheet 30 is driven along the path by a transport roller 40 as is understood by those skilled in the art or, for instance, as illustrated in U.S. Pat. No. 5,534,902, herein incorporated by reference. As the recording medium 30 exits the slot between the platen 36 and guide member 38, the sheet 30 is caused to reverse bow such that the sheet is supported by the platen 36 at a flat portion thereof for printing by the printheads 26.

To print color images received from a document creator, such as the personal computer 11, the image must be converted from an image defined in colorimetric terms, R, G and B electronic signals, which are typically digital in nature, to an output which is typically defined as existing in a color space of CMY and K electronic signals. To make such a conversion, the original color space must be transformed to the printer color space such that the resulting printed output reproduces the original image in a desired fashion.

In addition, since the original image typically includes image signals of up to 256 levels or greater, some type of output level reduction algorithm is applied to the output image signals such that a smaller number of output levels are actually printed than originally called for in the input image. While halftoning methods are a useful mechanism to reduce the number of levels including drops of ink, such methods suffer from an output which can include a pattern that is periodic or quasi-periodic in the spatial coordinates. Likewise though error diffusion has many advantages over halftoning, certain disadvantages exist as previously described.

Figure 1:
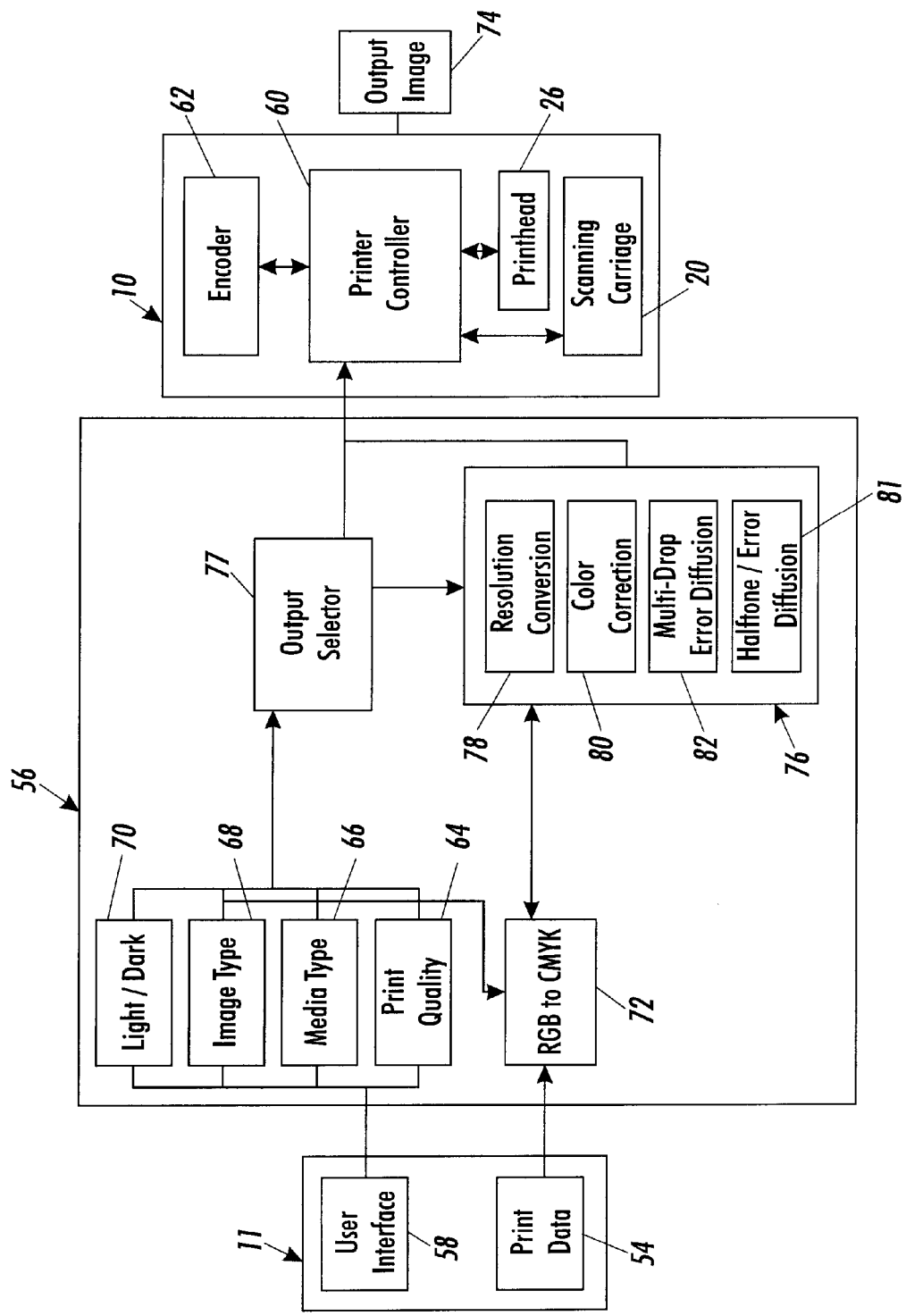
FIG. 1 is a schematic block diagram of a printing system including a print driver according to the present invention.

FIG. 1 illustrates schematic block diagram of the binary printing system of FIG. 4 including a print driver providing image input transformation as a function of multi-drop error diffusion. As illustrated a printing system, such as that illustrated in FIG. 1, receives an electronic representation of a document or image from the personal computer 11 here illustrated as print data 54 which is transferred to a print driver 56. The print driver can reside either in the computer 11 or the printer 10 or portions thereof can be present in either device. The print data 54 includes electronic digital data in some form from an original image or from another source, in a format related to the physical characteristics of the personal computer, typically including pixels. While a personal computer is shown, other known image input terminals, including a scanner, other computer image generators, or image storage devices are also possible.

In the instance of the personal computer 11, a user interface 58 is present on the display device of the personal computer 11 for providing for a variety of user selections for printing documents. The user interface 58, is likewise connected to the print driver 56, also known as an image processing unit. The print driver 56 processes the print data 54 in accordance with items selected by the user on the user interface 58 as well as other processes to be described. Once the print data has been processed by the print driver 56, the processed information is transmitted to the printer 10 here schematically illustrated to include a printer controller 60 being coupled to the printhead 26, the scanning carriage 20 and an encoder 62. While manipulation of the print data is shown to occur in the print driver, it can also occur in the image output terminal or printer 10.

From the user interface 58, a user can select one of a plurality of print quality modes, which can include, for instance, a draft mode, a normal mode, a high quality mode and a deluxe quality mode, the selection of which is stored in a print quality buffer 64. When one of the print quality modes is selected, one of a plurality of media types can be selected which can include the selection of plain paper, coated paper, glossy high resolution paper, and glossy deluxe resolution paper, the selection of which is stored in a media type buffer 66. The user may also select an image type such as a photographic image type or a graphic image type, the selection of which may be stored in an image type buffer 68. In addition, the user may select a range of lightness or darkness, the selection of which is stored in a light/dark buffer 70.

The print driver 56 receives the print data 54 from the computer 11 and converts the received print data, which is typically in Red, Green, and Blue (RGB) device independent data, to Cyan, Magenta, Yellow, and Key or Black(CMYK) device independent data at RGB to CMYK converter 72. The device independent data is then converted to device dependent data necessary for printing an output image 74. The conversion is performed by a rendering converter 76, responsive to certain inputs from an output selector 77 which receives the user interface input information. The rendering converter 76 can include a resolution conversion device 78, a color correction device 80, and a halftone/error diffusion device 81.

In accordance with the present, the rendering converter includes a multi-drop error conversion device 82. The multi-drop error conversion device 82 converts the device dependent CMYK image information to multi-drop pixel information as a function of a multi-drop error diffusion algorithm.

In the known error diffusion algorithms, the error is the difference between the gray value (0–255) of the original input digital gray scale image and the actual value which is printed white (0) or black (255). In the present invention, however, the error is determined to be the difference between the gray value (0–255) of the original input of digital gray scale image and an output value. This output level is one of a possible number of output levels each one corresponding to a specific number of ink drops. Consequently, for the present invention, the standard diffusion algorithm, which is expressed in two equations is calculated as a function of a plurality of threshold levels each of which corresponds to a plurality of ink drops. The first equation (Equation 1) determines the number of drops per pixel as a function of the defined threshold levels as follows:

$$b(m,n) = \text{step } [i(m,n) - \Sigma a_{jk} e(m-j, n-k) - T(i(m,n))] + X(i(m,n)) \qquad \text{Equation 1}$$

where i equals the image input pixel and T is the appropriate threshold level depending on the input level i(m,n). X is the number of drops for the largest of the output levels which is less than i(m,n), and b represents the number of drops to be printed at the pixel located at the $m^{th}$ column and $n^{th}$ row of the image.

The second equation (Equation 2) determines the error as a function of o(b(m,n)), where o(m,n) are output levels selected as a function of the number of drops per pixel, as follows:

$$e(m,n)=o(b(m,n))-[i(m,n)-\Sigma_{jk}e(m-j, n-k)] \quad \text{Equation 2}$$

Figure 2:
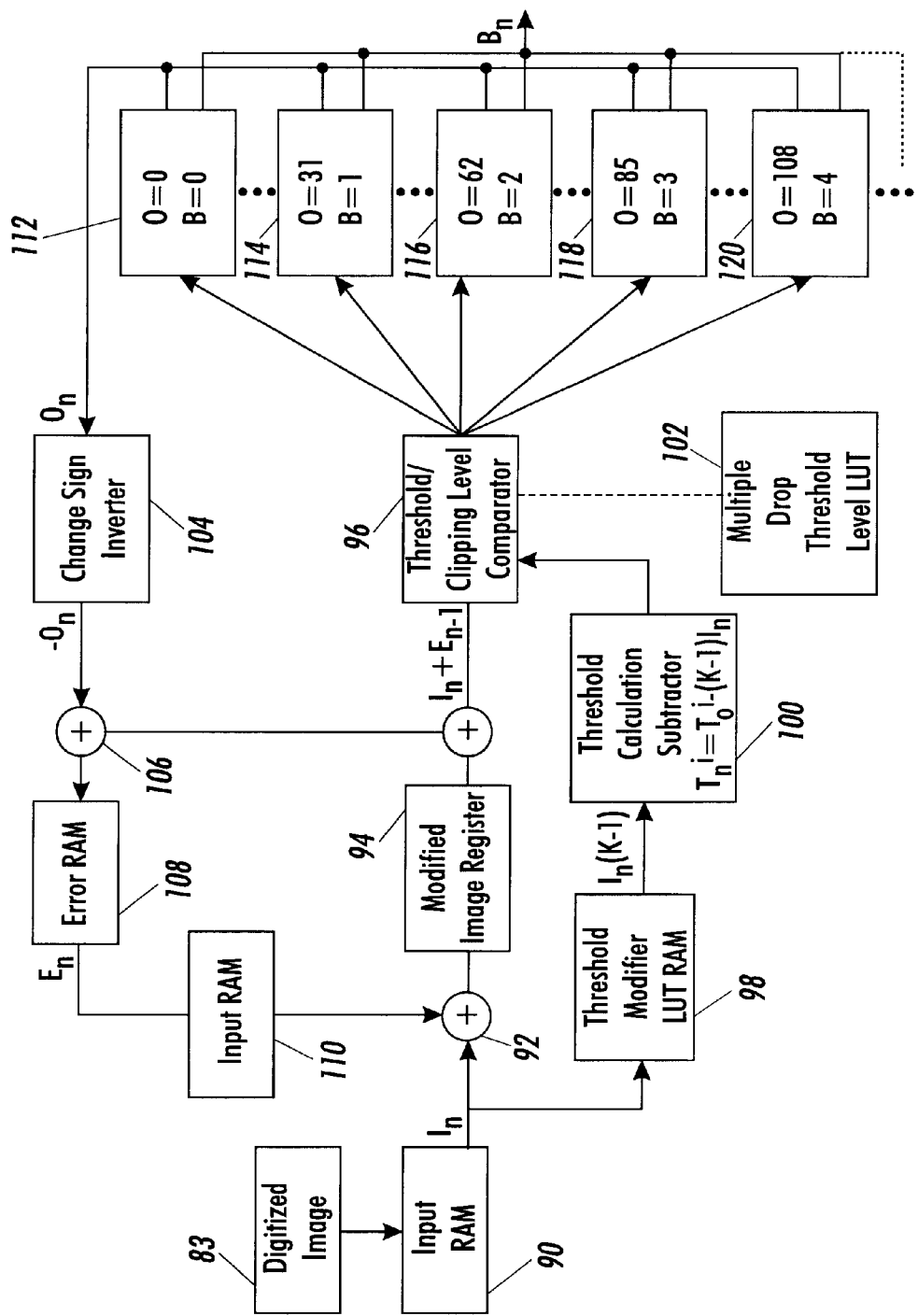
FIG. 2 is a schematic illustration of a multi-drop error diffusion circuit for one color plane of the present invention.

FIG. 2 illustrates a multi-drop error diffusion circuit of the present invention for a single color plane, such as cyan. Similar circuits exist for the remaining color planes. The circuit of FIG. 2 is incorporated into the multi-drop error diffusion circuit 82 of FIG. 1 which can either be a dedicated hardware circuit using standard logic circuits or a single chip using VLSI designs. More likely, however, the circuit of FIG. 2 may be implemented in a microprocessor including the appropriate software control programmed according to well known practices. It is commonplace to program and execute error control diffusion algorithms with software instructions for conventional or general purpose microprocessors. This is taught by various prior patents and commercial products. Such programming or software may, of course, vary depending on the particular functions, software type, and microprocessor or other computer system utilized but will be available to, or readily programmable, without undue experimentation from functional descriptions such as those provided herein or with prior knowledge of functions which are conventional together with general knowledge in the software and computer arts. Such software can include object oriented software development environments, such as C++.

subtractor 100 to determine the threshold value T to be applied at the threshold/clipping level comparator 96.

The modified image value $I_n+E_{n-1}$ is compared to the modified threshold level T to determine the appropriate output level B which is stored in a multiple drop threshold level look up table 102 stored in RAM or some other data storage device. This comparison determines the output level B, which is to be transmitted to the printer 10 of FIG. 1, where the output level B, is equivalent to a number of drops to be deposited at a single pixel location for cyan. In addition, the threshold/clipping level comparator 96 also determines the appropriate error level corresponding to the modified image value $I_n+E_{n-1}$ to be used for the error calculation.

Table 1, as shown below, includes a number of output levels for each color separation as function of the number of drops per pixel where the maximum number of drops is, for example, sixteen. The information in the table is incorporated in the LUT 102. The present invention is, however, applicable to any number of drops. In addition, the table illustrates an additional aspect of the present invention where the threshold levels are unique to each color plane. Output levels, C, M, Y, and K, the output level intervals (V) therebetween, and the thresholds, $T_C$, $T_M$, $T_Y$, $T_K$, for each output level are shown. The first row for each color separation are examples of levels which might be used in a multi-drop ink jet printer and the row below is the separation between the given level and the previous (lower one). Thresholds are typically, though not necessarily, halfway between levels are also shown. Level 0=0 is not shown.

TABLE 1

| # drops | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| C | 31 | 62 | 85 | 108 | 131 | 154 | 177 | 200 | 211 | 222 | 233 | 238 | 243 | 248 | 251 | 255 |
| V | 31 | 31 | 23 | 23 | 23 | 23 | 23 | 23 | 11 | 11 | 11 | 5 | 5 | 5 | 3 | 4 |
| $T_c$ | 15 | 46 | 73 | 96 | 119 | 142 | 165 | 188 | 205 | 216 | 227 | 235 | 240 | 245 | 249 | 253 |
| M | 29 | 58 | 83 | 108 | 133 | 158 | 175 | 192 | 209 | 216 | 223 | 230 | 237 | 244 | 251 | 255 |
| V | 29 | 29 | 25 | 25 | 25 | 17 | 17 | 17 | 7 | 7 | 7 | 7 | 7 | 7 | 7 | 4 |
| $T_m$ | 14 | 43 | 70 | 95 | 124 | 145 | 166 | 183 | 200 | 212 | 219 | 226 | 233 | 240 | 247 | 253 |
| Y | 33 | 66 | 93 | 120 | 141 | 162 | 177 | 186 | 195 | 204 | 213 | 222 | 231 | 240 | 249 | 255 |
| V | 33 | 33 | 27 | 27 | 21 | 21 | 15 | 9 | 9 | 9 | 9 | 9 | 9 | 9 | 9 | 6 |
| $T_y$ | 16 | 49 | 79 | 106 | 130 | 151 | 169 | 181 | 190 | 199 | 208 | 217 | 226 | 235 | 244 | 252 |
| K | 35 | 70 | 89 | 108 | 127 | 146 | 165 | 184 | 197 | 210 | 221 | 232 | 239 | 246 | 251 | 255 |
| V | 35 | 35 | 19 | 19 | 19 | 19 | 19 | 19 | 13 | 13 | 11 | 11 | 7 | 7 | 5 | 4 |
| $T_k$ | 17 | 52 | 79 | 98 | 107 | 136 | 155 | 174 | 190 | 203 | 204 | 213 | 220 | 229 | 248 | 253 |

The converter 72 generates a digitized image signal 83 which is input to an input random access memory (RAM) 90 which stores portions of one or more complete full page image bitmaps. The input RAM is addressed to introduce the input digital image signal $I_n$ into the circuit on a pixel-by-pixel basis. Each input pixel has its corresponding error $E_{n-1}$ added to the input value at an adder 92. The modified image is temporarily stored in a modified image register 94. The modified image $I_n+E_{n-1}$ is transferred to a threshold/clipping level comparator 96. If one wanted to produce a particular degree of edge enhancement then the modified threshold level, $T_n$, is determined by first calculating a modifier based on the input value $I_n$ of each pixel as represented by a threshold modifier lookup table 98 stored in RAM or some other data storage device. Values of input levels $I_n$ as well as corresponding threshold modifiers (K-1) are stored in the lookup table 98 and are selected in response to the value of the input $I_n$. The modified $I_n$ (K-1) is then subtracted from the nominal threshold value $T_0$ in a threshold calculation When the modified image, $I_n+E_{n-1}$ exceeds a threshold level, the corresponding output $O_n$ level is selected and transmitted to the change sign inverter 104. The output level is subtracted from the modified image value to determine the error level for the subsequent input pixel. The subtraction operation occurs due to the sign inversion performed by the change sign inverter and the adder 106, the value of which is stored in the error RAM 108. A delay buffer 110 generates a single pixel delay to store the error value in a 1 dimensional situation. In a multidimensional situation, the error value is split and distributed according to a distribution scheme among adjacent and nearby pixels as is known in the art.

As an example, for a sixteen drop system, using the values from cyan in Table 1, when the input level plus the error from the previous pixel are compared at the threshold level comparator and such level does not exceed the threshold (a value of 15) for one drop as shown at block 112, then zero drops are transmitted to the printer and the output level of zero is transmitted to the changed sign inverter 104 where the circuit operates as previously described. Likewise, if the input level plus the error from the previous pixel reaches the threshold level for the number of drops being equal to one at block 114 then one drop is transmitted for that pixel location to the printhead and the value of 31 is returned to the changed sign inverter 104. Examples for 2, 3, and 4 drops are also respectively shown in blocks 116, 118 and 120. The levels for thresholding for each of the drop values have been selected from Table 1 such that the threshold level for two drops is 46, 3 drops is 73, and for 4 drops the threshold is 96, and so on up to 16 drops. It is of course possible that other threshold values can be used to determine how many drops are deposited.

The choice of the output levels as illustrated in Table 1 provides distinct advantages. One advantage is that choosing levels to match the rise in a tone reproduction curve can compensate for the rapid increase to black and tone reproduction curves for binary error diffusion. Thus by choosing levels roughly in accord with the rise in the tone of the reproduction curve prevents many levels from being thrown away in the shadows. While stretching of the tone reproduction curve in this manner is useful, it is not the primary consideration for the values of the levels chosen since finer corrections to the TRC can be implemented along with the color transformation from R, G, and B to C, M, Y, and K space. The main rationale is that the selection of thresholding choice is to reduce other artifacts in the binary error diffusion algorithm. An initial advantage is the ability to manipulate these values to best remove image artifacts. By choosing the difference between the multiple levels as odd values in preferably, numbers which are not divisible by three, the limit cycles typically seen in an output image are greatly reduced. Using prime numbers is desirable, unfortunately there are only a limited number of prime numbers. Because the inputs are in integer values and not really continuous, the particular levels at which limits cycles are a problem are simply avoided or at least reduced. If a given prime number is used as a factor in only one color plane it can be reused for different levels without introducing conflicts between color planes.

One main artifact of color binary error diffusion is the accidental correlation of pixels on different color planes. Depending on the initial conditions, the error carried over from previous pixels, the color drops can be separate but they can also lie on top of each other or quite near each other. The patterns are likely to be highly correlated. The potential for artifacts and color shifts are also great. Such effects are reduced or eliminated in the present multi-drop approach. By choosing values for the differences between threshold levels that are unique for each color, there is substantially no possibility for correlation between color planes. For instance as seen in Table 1, for cyan the first threshold level is set to 31, for magenta 29, for yellow 33, and for black 35. It is preferable to use a values divisible by 2 or 3 for yellow and very dark levels because the ½, ⅓, and ⅔ limit cycles are not as noticeable either for yellow or in dark shadow regions. For a fixed input of C=M=Y, therefore, the colors will not correlate even though the input level is the same. The decorrelation happens because no two levels on different color planes can be the same fraction of the separation between levels. For instance, for a CMY input of 1, 1, 1, the effective input relative to the first level is $1/31$, $1/29$, and $1/33$ respectively. Since the level spacings are all different and where possible are prime numbers, correlation is substantially eliminated.

Worms are automatically reduced in with multi drop processing. In the case of a light input, such as a level 1 input, where worms are most severe, more light or small drops are called for than would be in the pure binary case, worms are significantly reduced. In the example above if the CMY input were 1,1,1. The input relative to the first level is $1/43$, $1/41$, and $1/39$ respectively means that one drop prints within a region of roughly 31, 29, and 33 pixels for C, M, and Y respectively. At this frequency error diffusion algorithms are less prone to worms than in the binary case, where an input of 1 means one drop is printed within an area of 255 pixels. In other words, in the binary case the 255 pixel region is very asymmetric with drops clustered in 1 dimension and spread our in the perpendicular dimension, while the 31, 29, and 33 pixel regions around a printed drop are more symmetric.

An additional aspect of the present invention includes the assignment of drops to positions within the pixel location to be printed. This allows for further flexibility to optimize the pixel placement, the image quality, and the stability of a particular printer. One such filling method is described in U.S. Patent Application "Liquid Ink Printing With Small Drop Overprinting", Ser. No. of 08/673,517, to David Mantell, herein incorporated by reference. As described there, grayscale printing with liquid ink can be greatly improved by depositing a number of small ink drops unequally or equally spaced within a pixel space or location where each drop has a different drop center but which are clustered near the center of the pixel space. To achieve the advantages of small drop overprinting, the printhead 28 includes smaller nozzles such that the maximum total number of drops of ink selected to be ejected within pixel location substantially fills the pixel location as would a single drop filling the pixel location.

Figure 3:
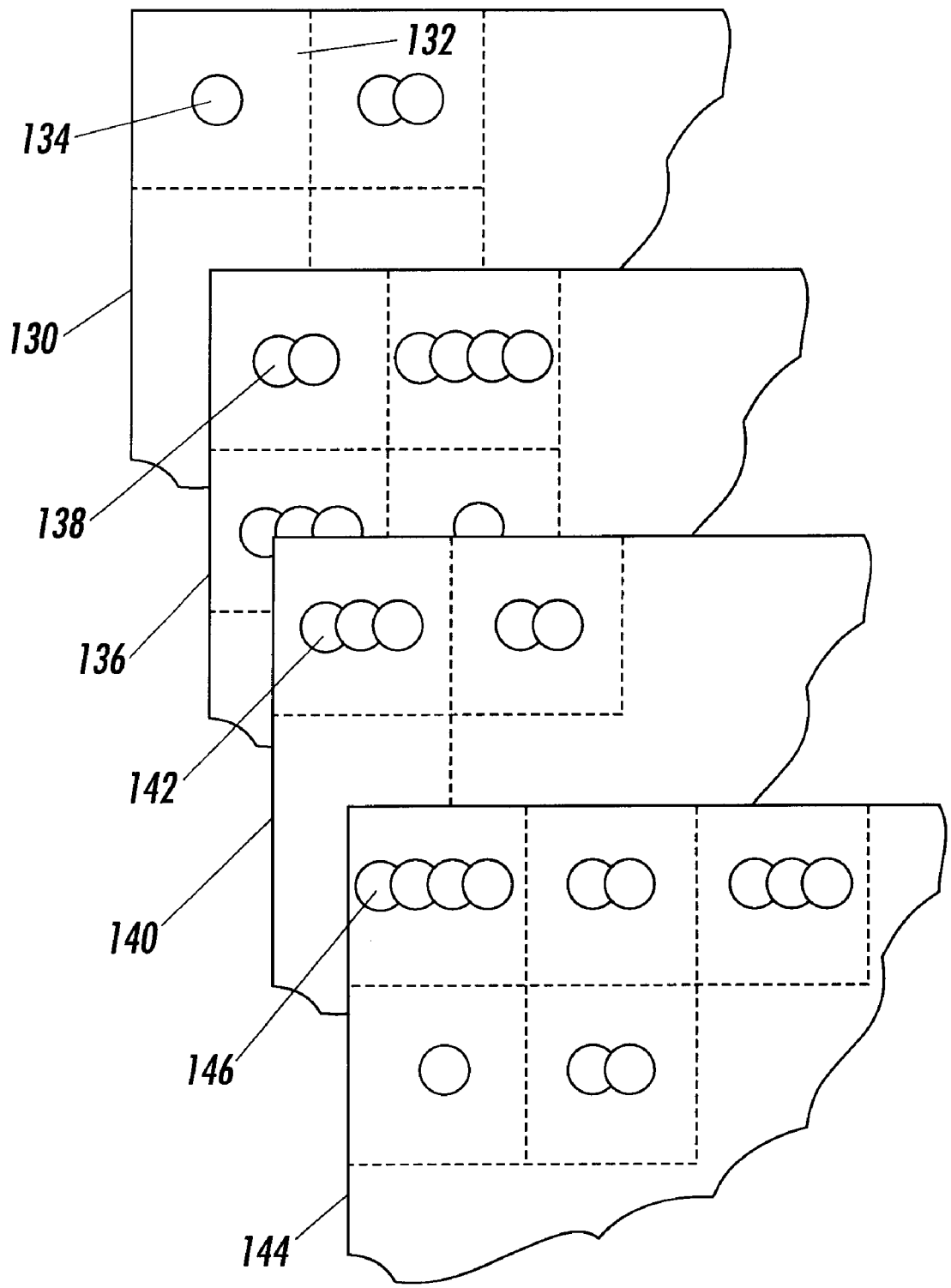
FIG. 3 is a schematic illustration of cyan, magenta, yellow, and black color planes including ink drops deposited according to small drop overprinting.

The image data pixels are commonly grouped into separations. Each separation provides a set of image signals or separation pixels. These might be used to drive a printer to produce one color separation of the image. In the case of multi-color printers, however, these separations, superimposed together, form the color image. For instance, as illustrated in FIG. 3, a plurality of color separations are separately shown for purposes of illustration. A first color separation 130 schematically illustrated for cyan, for instance, includes a pixel location 132 wherein a single drop or dot 134 of cyan ink would be directed to be printed by the printer 10. A second color separation 136 for magenta includes two drops of ink 138 within a single pixel location. A third color separation 140 for yellow includes three drops of ink 142 within a single pixel location. A fourth color separation 144 of black includes four drops of ink 146 within a single pixel location. The drops are illustrated before spreading.

It is also possible to use the present invention with respect to multiple drops placed one on top of another within a single pixel location.

There are numerous other printer configurations in which this algorithm would be useful. One is in acoustic ink printing. In such a printer many small drops are printed rapidly within approximately ¼ of a given pixel location at 600 spi. The multi-drop error diffusion part of the algorithm is the same to that described above. The primary consideration is eliminating possible color shifts in highlight regions due to pixel overlap variation and correlations between pixels. Offsetting the colors slightly can be done by the pattern of pixels printed as with the case described above even thought the subpixel grid does not cover the entire pixel. In this technology, as with other ink jet technologies, it is possible to produce small variations in the volume drops out of the same ejector. Thus it is possible and desirable that the first drop be smaller than the rest or that some of the drops be of one volume and the others be of a different volume. In the error diffusion, each output level still corresponds to the number of drops as described above. Alternatively, the first drop or drops could be printed with an ink of a different density from a different printhead or part of the same printhead. Still, each output level corresponds to a number of drops as described above. Such inks include light cyan, regular cyan, light magenta, and regular magenta.

Another approach, which can be used in conjunction with the pattern approach, is to offset the color pixels with respect to each other in the hardware. For example the position of the drops can be physically offset slightly with a given pixel location by either changing the time of firing of the nozzles, this would displace the colors in the scan direction, and/or a slight offset of the color nozzles in the non-scan direction. Alternatively, if the pixels are separated so the instead of all the drops printing on a 600 spi square grid, half of the drops are placed at every 1200 spi in the scan direction (while still placed on a 600 dpi grid in the non-scan direction) the choice of drops could be optimized between the two positions much the same as described earlier in the thermal ink jet case.

While this invention has been described in conjunction with a specific embodiment thereof, in an ink jet environment, it is evident that many alternatives, modifications, and variations will be apparent to those skilled in the art. For instance, the present invention is not limited to the embodiments shown, but is applicable to any liquid ink printer including liquid ink printheads. For instance, in one practical embodiment of the present invention, the printhead could include a single nozzle array wherein the array is segmented into different colors. In addition, the present invention while being described with regards to a certain algorithms for depositing ink is not limited thereto and can also be used for checkerboard printing as well as multi-drop checkerboard printing. Likewise, while the present invention has been described with respect to the error diffusion algorithm, it is also applicable to other image processing algorithms using error feedback. Accordingly, it is intended to embrace all such alternatives, modifications and variations that fall within the spirit and broad scope of the appended claims.

What is claimed is:

1. A method of producing a print driver, for a color liquid ink printer, depositing drops of ink on a recording medium in response to an input image, including a plurality of input pixels each having a first number of input levels of optical density, to form an output image including a plurality output pixels, each having a second number of output levels of optical density, comprising:
   determining the second number of the plurality output levels as a function of the first number of the plurality of input levels;
   assigning a threshold reference signal to each of determined number of the plurality of output levels;
   assigning a number of ink drops to each of the determined number of the plurality of output levels wherein a portion of the number of ink drops includes a first volume of ink and a remaining portion of the number of ink drops includes a second volume of ink;
   generating a signal lookup table including the assigned threshold reference signals and the assigned number of ink drops; and
   producing a print driver, including an error diffusion circuit, coupled to the signal lookup table, to receive from the signal lookup table one of the assigned threshold reference signals.

2. The method of claim 1, wherein said producing step comprises producing the print driver, including the error diffusion circuit, to generate a drop generation signal as a function of the receipt from the signal lookup table of one of the assigned threshold reference signals.

3. The method of claim 2, comprising an output image including a plurality of color separations, each including a plurality of output pixels, each having a second number of output levels of optical density.

4. The method of claim 3, wherein said determining step comprises determining the second number of the plurality of output levels for each of the plurality of output pixels of each of the plurality of color separations.

5. The method of claim 4, wherein said first mentioned assigning step comprises assigning the threshold reference signal to each of the second number of the plurality of output levels for each of the plurality of output pixels of each of the plurality of color separations.

6. The method of claim 5, wherein the difference between adjacent output levels is different for two of the plurality of color separations of a selected one of the second number of the plurality of output levels.

7. The method of claim 6, wherein the difference between adjacent output levels is different for each of the plurality of color separations of a selected one of the second number of the plurality of output levels.

8. The method of claim 7, wherein the plurality of color separations comprise a cyan, a magenta, and a yellow color separation.

9. The method of claim 8, wherein the plurality of color separations include a black color separation.

10. The method of claim 1, wherein said assigning step comprises assigning a number of ink drops, each of the ink drops including the same volume of ink.

11. A color printing system for printing in response to an input image signal, including a plurality of input pixels each having a first number of input levels of optical density, an output image including a plurality of pixel location, comprising:
   a printhead, to deposit a plurality of ink drops on the recording media to print the image; and
   a print driver for controlling said printhead, said print driver receiving the input image signal and including an error diffusion circuit generating a drop signal as a function of an error signal and a threshold reference signal for causing said color printhead to deposit a plurality of ink drops within one of a plurality of pixel locations, said drop signal causing said color printhead to deposit a plurality of ink drops such that a portion of the plurality of ink drops includes a first drop volume and a remaining portion of the plurality of ink drops includes a second drop volume.

12. The color printing system of claim 11, wherein said print driver comprises a signal lookup table, including a plurality of threshold reference signals and a plurality of drop signals, each of said plurality of threshold reference signals associated with one of said plurality of drop signals.

13. The color printing system of claim 12, wherein said error diffusion circuit comprises a comparison circuit, to compare sum of the input level of one of the plurality of input pixels and an error signal, to one of the plurality of threshold reference signals, to generate one of said plurality of drop signals.

14. The color printing system of claim 13, wherein the output image comprises a plurality of color separations, each including a plurality of output pixels.

15. The color printing system of claim 14, wherein said print driver comprises a plurality of output level interval signals including a first plurality of output level interval signals associated with a first one of the plurality of color separations and a second plurality of output level interval signals associated with a second one of the plurality of color separations.

16. The color printing system of claim 15, wherein one of said first plurality of output level interval signals and one of said second plurality of output level interval signals is associated with one of said plurality of drop signals.

17. The color printing system of claim 16, wherein said one of said first plurality of output level interval signals and said one of said second plurality of output level interval signals associated with said one of said plurality of drops signals are different.

18. The color printing system of claim 17, wherein the first one of the plurality of color separations comprises one of a cyan, a magenta, or a yellow separation.

19. The color printing system of claim 18, wherein the second one of the plurality of color separation comprises black.

20. The color printing system of claim 18, wherein one of the plurality of color separations comprises a color including a different dye loading than the dye loading of another color of the same hue.

21. The color printing system of claim 15, wherein said first plurality of threshold reference signals is different than said second plurality of threshold signals.

22. The color printing system of claim 21, wherein said first plurality of output level interval signals include a first number of output level interval signals which are divisible by a number different than a second number of output level interval signals.

23. The color printing system of claim 22, wherein first plurality of output level interval signals include a first number of output level interval signals which are divisible only by a single prime number.

24. The color printing system of claim 12, wherein said drop signal causes said color printhead to deposit a plurality of ink drops within one of the plurality of pixel locations, each of the plurality of ink drops including a drop volume of the same size.

\* \* \* \* \*